United States Patent [19]

Johnson et al.

[11] 4,226,311
[45] Oct. 7, 1980

[54] ROTARY DRIVE DISC BRAKE FOR DRAWWORKS

[75] Inventors: Earl R. Johnson; Lesley G. Watkins, both of Tulsa, Okla.

[73] Assignee: Loffland Brothers Company, Tulsa, Okla.

[21] Appl. No.: 958,107

[22] Filed: Nov. 6, 1978

Related U.S. Application Data

[62] Division of Ser. No. 795,106, May 9, 1977, Pat. No. 4,144,953.

[51] Int. Cl.² ............... F16D 57/10; B60K 41/24; B60T 7/12
[52] U.S. Cl. ................... 192/8 R; 192/12 C; 192/144; 192/150; 173/12; 175/24; 188/134
[58] Field of Search ............ 173/12; 175/24; 74/411.5; 192/8 R, 12 C, 150, 144; 188/134, 218 XL

[56] References Cited

U.S. PATENT DOCUMENTS

| | | | |
|---|---|---|---|
| 1,904,765 | 4/1933 | Hawk | 173/12 X |
| 1,954,176 | 4/1934 | Johnson | 173/12 |
| 2,245,960 | 6/1941 | Claire | 173/12 |
| 2,765,881 | 10/1956 | Pierce | 188/218 XL |
| 2,816,631 | 12/1957 | Butler | 188/218 XL |
| 2,836,270 | 5/1958 | Leopold | 192/12 C |
| 3,101,828 | 8/1963 | Wilson | 192/144 X |
| 3,469,658 | 9/1969 | Forsythe | 188/218 XL |
| 3,478,849 | 11/1969 | Hahm | 188/218 XL |
| 3,596,740 | 8/1971 | Nau | 192/8 R |
| 3,691,859 | 9/1972 | Peters | 192/144 X |
| 3,716,106 | 2/1973 | Peterson | 173/12 X |
| 3,797,614 | 3/1974 | McCay, Jr. | 188/134 |
| 3,994,178 | 11/1976 | Hore | 188/134 |
| 3,994,376 | 11/1976 | Fulghum | 192/8 R |
| 4,015,619 | 4/1977 | Shore et al. | 192/12 C |

FOREIGN PATENT DOCUMENTS

| | | | |
|---|---|---|---|
| 1008751 | 4/1977 | Canada | 192/12 C |
| 1126816 | 4/1962 | Fed. Rep. of Germany | 74/411.5 |
| 978563 | 12/1964 | United Kingdom | 175/24 |

Primary Examiner—Leslie Braun
Attorney, Agent, or Firm—Head & Johnson

[57] ABSTRACT

A disc-type brake apparatus adapted for installation in combination with the drawworks of a well bore drilling operation for automatically sensing any reverse torque situation in the drill pipe and quickly set the brake for precluding transmission of any reverse torque to the rotary table drive and clutch mechanism therefor.

5 Claims, 5 Drawing Figures

ROTARY DRIVE DISC BRAKE FOR DRAWWORKS

This is a division of application Ser. No. 795,106, filed May 9, 1977 now U.S. Pat. No. 4,144,953.

BACKGROUND OF THE INVENTION

1. Field of the Invention

This invention relates to improvements in well drilling operations and more particularly, but not by way of limitation, to disc-brake means for protection of the drawworks in a reverse torque situation.

2. Description of the Prior Art

In a well bore drilling operation, such as an oil and/or gas well bore drilling operation, the well bore is usually drilled into the earth by means of a drill bit carried at the lower end of a string of drill pipe. A rotating device known as a rotary table is normally utilized for rotation of the drill pipe during the well bore drilling operation for transmitting rotation to the drill bit, and the power equipment utilized for rotating the rotary table is called a drawworks. The drawworks usually includes a countershaft interposed between a cable drum and the rotary table during the drilling operation and also has a clutch member operable by the countershaft for controlling the driving rotation of the rotary table. As the drill pipe is rotated within the well bore for the drilling operation, a considerable torque builds up in the drill string, particularly in deep well bores, such as twenty-five thousand feet or more in depth, which are being drilled today. When the pipe "hangs up" in the bore for any reason, the backlash or reverse torque applied to the rotary table is exceedingly great. This reverse torque usually completely "tears up" the clutch and may often do great damage to other portions of the drawworks and well drilling equipment, in addition to which some of the drill pipe may be lost in the well bore.

SUMMARY OF THE INVENTION

The present invention contemplates a disc-type braking attachment adapted to be installed in the drawworks for automatically sensing any reverse torque in the drill string and stopping the rotation of the table drive for protection of the drawworks and rotary table from the reverse torque. The drawworks is usually provided with a countershaft connected with the rotary table through a pulley whereby rotation is transmitted to the rotary table from the drum shaft through a suitable clutch mechanism. In one embodiment of the invention, a brake disc is connected directly with the countershaft for rotation simultaneously therewith. A brake caliper assembly is mounted in the proximity of the brake disc for selective engagement with the disc in order to stop the rotation of the disc, thus stopping the rotation of the countershaft and pulley when the brake is engaged. When any reverse torque condition arises in the drill pipe being rotated by the rotary table, a fluid system senses the force and immediately actuates the brake assembly for precluding any reverse torque being transmitted through the rotary table to the drum shaft, or to the clutch. The operator of the drilling equipment may take control of the braking apparatus subsequent to the automatic actuation thereof and ease off the reverse torque in the drill pipe without damage to any of the drawwork equipment. The novel braking system is simple and efficient in operation and economical and durable in construction.

DESCRIPTION OF THE PREFERRED EMBODIMENT

Figures 1, 4:
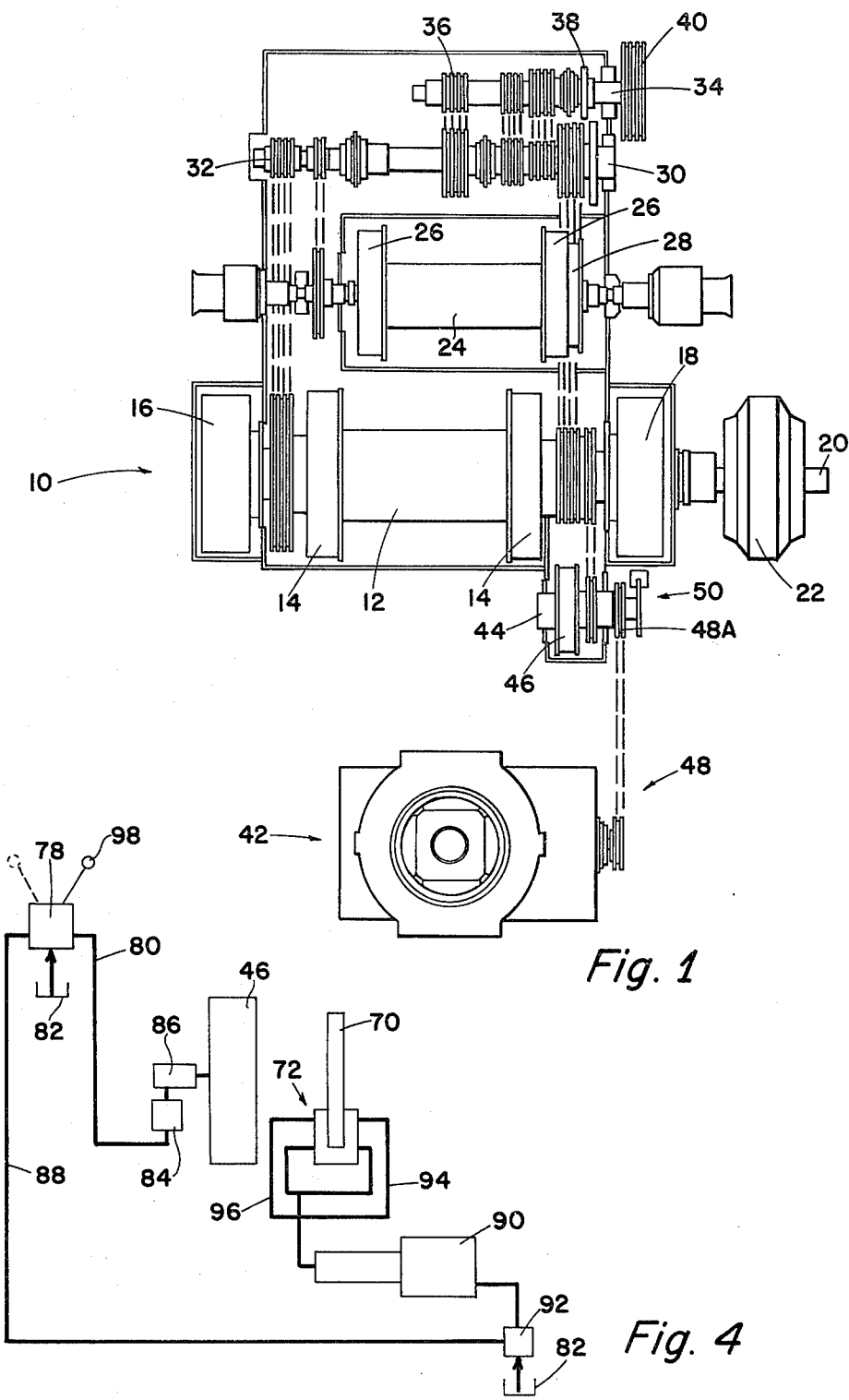
FIG. 1 is a plan view of a drawworks and rotary table having a braking apparatus embodying the invention installed thereon.
FIG. 4 is a schematic view of a fluid actuation system utilized with a braking apparatus embodying the invention.

Referring to the drawings in detail, reference character 10 generally indicates a drawworks such as normally present at the site of a well bore drilling operation and comprising a main hoist drum 12 having hoisting drum brakes 14 usually mounted on the opposite ends thereof. A suitable low drum clutch 16 is normally mounted in the proximity of one end of the drum 12 outboard of the respective brake 14, and a suitable high drum clutch 18 is normally mounted at the opposite end of the drum 12 outboard of the other brake 14, as particularly shown in FIG. 1. The central shaft 20 of the drum 12 usually extends longitudinally outwardly from one end of the drum and through a suitable hydromatic 22 which functions as an auxiliary brake during a well bore drilling operation, as is well known. In addition, it is usually desirable to provide a sandreel 24 in the proximity of the main drum 12 and preferably in substantial parallel relation thereto. The sandreel 24 is normally provided with suitable brakes 26 at the opposite ends thereof, and a sandreel clutch mechanism 28 is disposed in the proximity of one of the brakes 26. A suitable jackshaft 30 is usually provided in spaced relation to the sandreel 24 and preferably substantially parallel with respect thereto, and which carries a suitable low drum drive 32 operably connected with the main drum 12 in any well-known manner as particularly shown in FIG. 1. An input shaft 34 is also normally provided for the drawworks 10 and may be installed in spaced and parallel relation to the jackshaft 30. A suitable transmission chain 36 and reverse gear 38 are preferably carried by the input shaft 34, and it is preferable to provide a chain drive power input 40 on one end of the input shaft 34, all as is well known in the industry.

A rotary table generally indicated at 42 is normally provided in the well bore site for rotating the drill string (not shown) during a well drilling operation. The rotary table 42 is operably connected with a countershaft 44 of the drawworks 10 through a rotary clutch mechanism 46, normally mounted on the countershaft 44, and pulley and drive chain generally indicated at 48 whereby rotation is transmitted to the rotary table for rotating the drill string.

Figure 2:
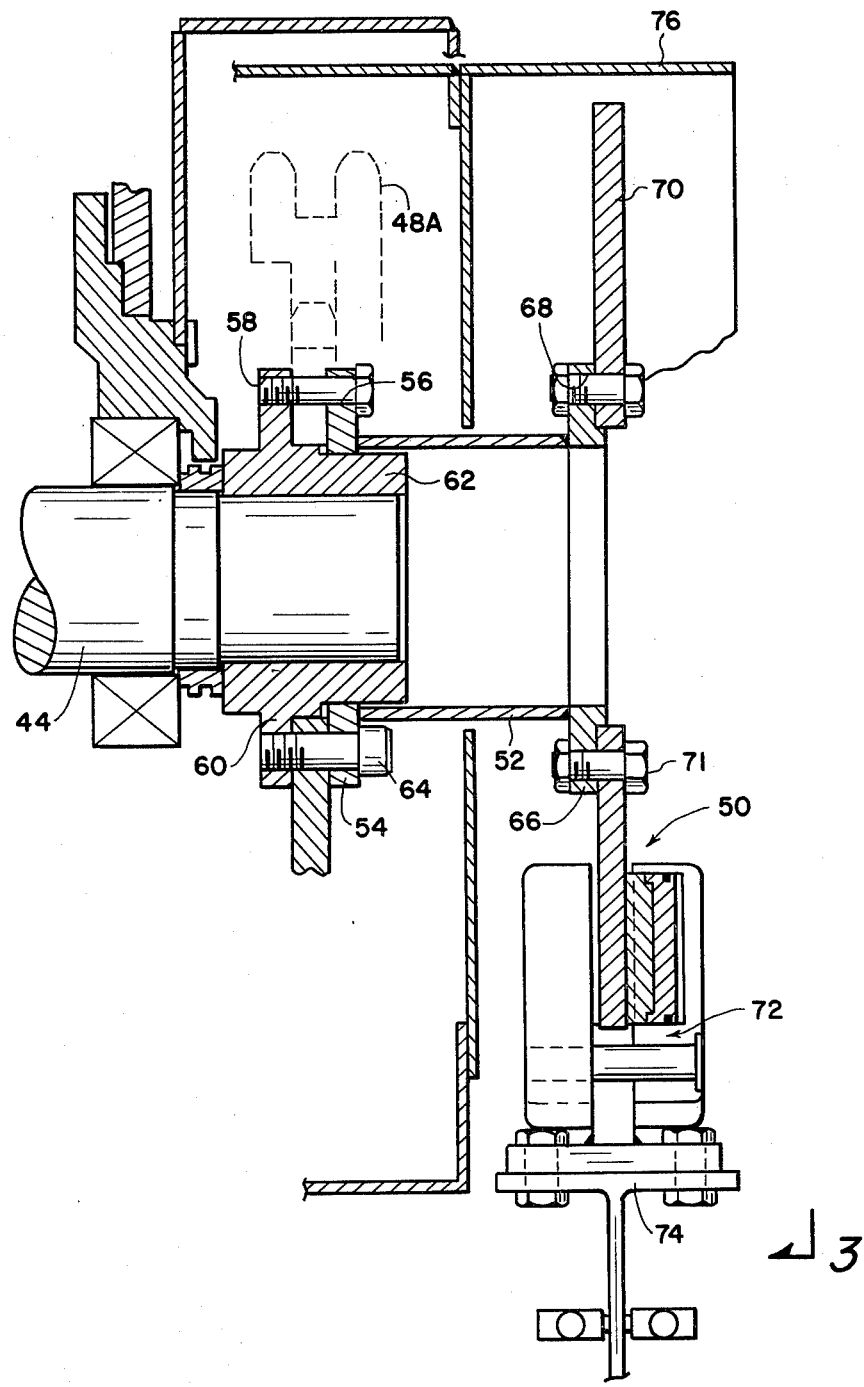
FIG. 2 is a side elevational view, partly in section, of a portion of a countershaft of a drawworks and having a braking apparatus embodying the invention installed thereon.
Figure 3:
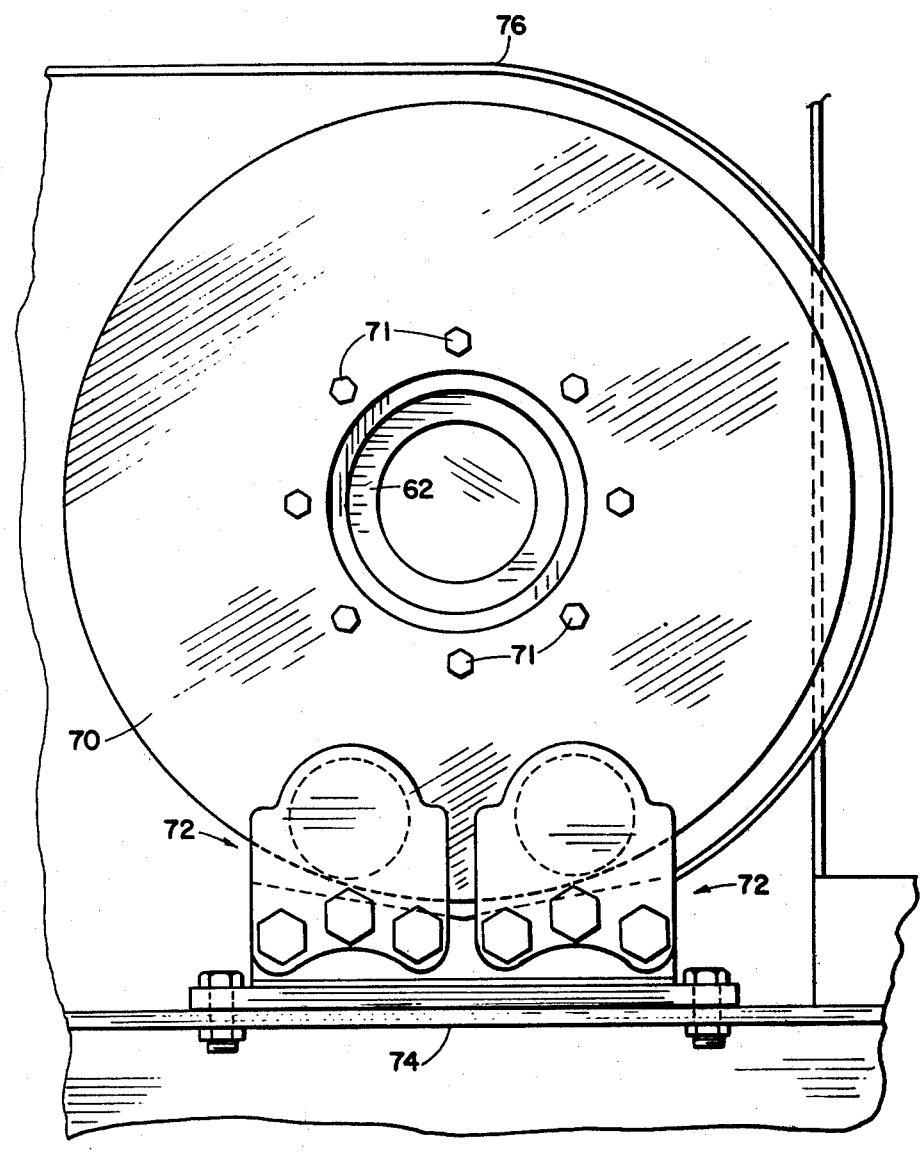
FIG. 3 is a view taken on line 3—3 of FIG. 2.

Referring now to FIGS. 2 and 3, a disc-type brake assembly is generally indicated at 50 which may be installed on the drawworks 10 in a manner for automatically sensing any reverse torque situation in the drill string for stopping the rotation of the countershaft, thus protecting the rotary clutch and drawworks from damage due to the reverse torque.

The brake assembly 50 as shown herein comprises a sleeve 52 having a first outwardly extending flange member 54 provided at one end thereof. The flange 54 is provided with a plurality of suitable circumferentially spaced apertures 56 corresponding with the usual bolt holes 58 provided on the standard flange 60 of a hub member 62 secured to the outer end of the countershaft 44 in any suitable manner. A pulley 48A of the pulley and chain assembly 48 and the flange 54 are both bolted or otherwise secured to the outer periphery of the hub 62 by suitable bolts 64 whereby the pulley 48A and sleeve 52 rotate simultaneously with the countershaft 44.

A second outwardly extending circumferential flange member 66 is provided on the opposite end of the sleeve 52 and is provided with a plurality of suitable circumferentially spaced bolt holes 68 whereby a suitable annular friction disc or brake disc member 70 may be secured to the flange 66 by suitable bolt 71. Thus, the brake disc 70 will rotate simultaneously with the countershaft 44 for a purpose as will be hereinafter set forth.

A caliper brake generally indicated at 72 is mounted on a suitable support structure 74 provided in the proximity of the rotary clutch 46 and countershaft 44 whereby the brake disc 70 passes through the caliper brake 72 between the gripping or braking elements thereof as well known in disc-type brake. As particularly shown in FIG. 3, it is preferable to provide two of the caliper brakes 72 in spaced relation whereby the friction disc 70 passes through both brakes and between the gripping or braking elements thereof for assuring an efficient braking engagement with the disc 70 when the brakes 72 are in an engaged position as will be hereinafter set forth. Of course, it is preferable to provide a suitable substantially cylindrical guard or housing 76 around the outer periphery of the disc 70 for safety purposes as is well known.

The brake assembly 50 as depicted herein is particularly designed and constructed for installation on the countershaft 44 of the drawbacks 10. However, the sleeve 52 and flanges 54 and 66 may be designed for installation of the braking disc 70 and caliper brakes 72 in combination with substantially any rotating element wherein braking action is desired. In the particular embodiment disclosed herein, the sleeve 52 and flanges 54 and 66 secure the brake disc 70 to the countershaft 44 in a manner wherein the disc is disposed outboard of the chain drives of the drawworks, which removes the brakes 72 from the area wherein oil from the chain drives might otherwise come into contact with the braking assembly and reduce the effective braking action.

Referring now to FIG. 4, a typical arrangement for the braking system 50 in association with an actuation system therefor is shown wherein a suitable driller's control valve 78, preferably a pressure regulating air valve but not limited thereto, selectively controls the rotary clutch 46 for a "drilling ahead" operation and the rotary braking system 50 when braking action is required during the drilling operation. The control valve 78 also supplies the fluid pressure for the caliper brake assemblies 72 for maintaining the brakes 72 in proper position to engage the opposite sides of the brake disc 70 as will be hereinafter set forth.

An air line 80 supplies air from a suitable air supply source 82 to a suitable quick release valve 84 through a suitable rotor seal 86, and thence to the rotary clutch 46. The control valve 78 is interposed in the air line 80 between the supply source 82 and the quick release valve 84 for controlling the supply of air to and through the line 80, as is well known. A second air line 88 supplies air to the air chamber of an air-over-oil brake actuator device 90. Of course, any suitable fluid pressure intensifier may be utilized in lieu of the air-over-oil actuator 90, if desired. In addition, it is preferable to interpose a suitable relay valve 92 upstream or ahead of the air-over-oil actuator 90 for providing a quicker brake action. The caliper brakes 72 are operably connected with the air-over-oil actuator 90 by suitable fluid lines 94 and 96. The high pressure fluid from the intensifier or actuator 90 is distributed to the brake calipers 72 through the lines 94 and 96 for actuation thereof as required during a drilling operation.

The driller's control valve 78 is provided with the usual hand lever 98 for normal operation thereof, as is well known, and is so arranged whereby one position of the valve, as, for example, the position shown in solid lines in FIG. 4 directs the control air to the rotary clutch, and another position, such as that shown in broken lines in FIG. 4 directs the brakes 72. Of course, the control valve 78 also exhausts the control air from the clutch when the air is being supplied to the brakes, and vice versa, thus preventing simultaneous application of the clutch and brake.

Figure 5:
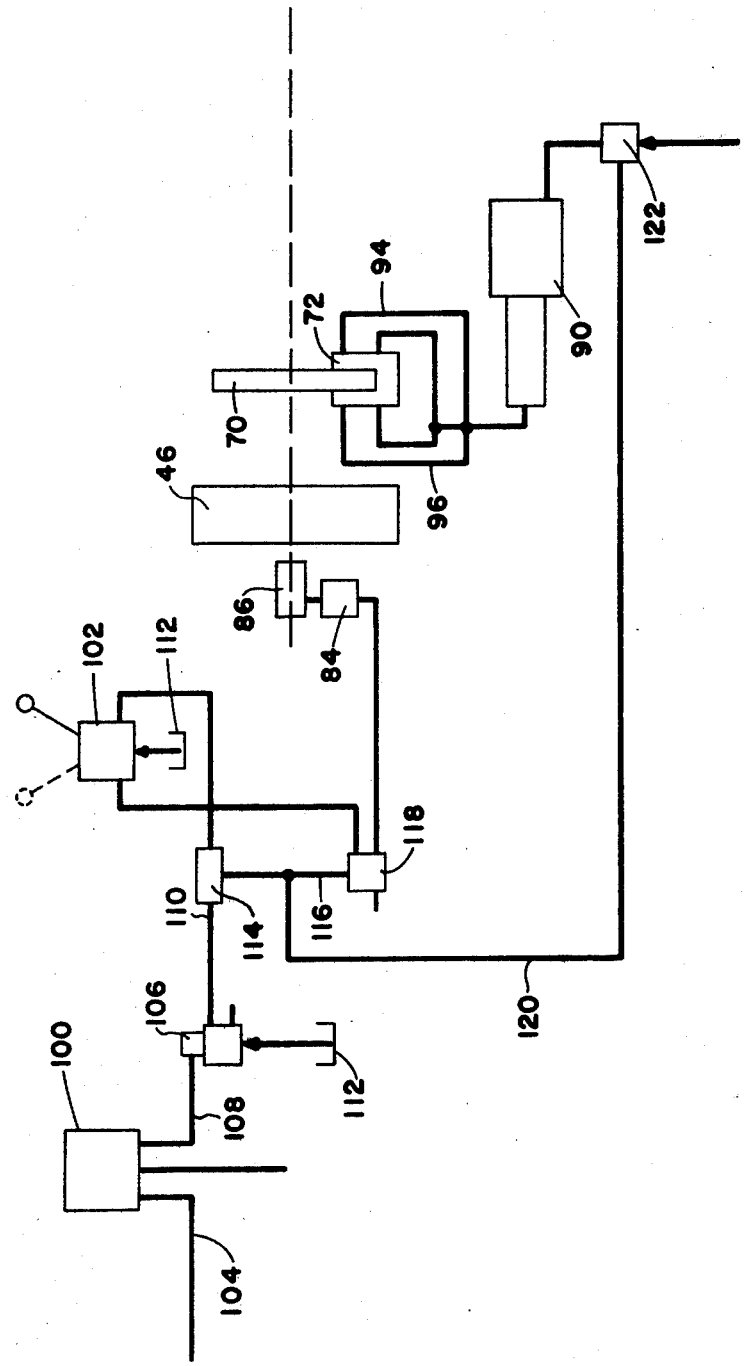
FIG. 5 is a view similar to FIG. 4 illustrating a modified activation system of the invention.

Referring to FIG. 5, an electroc-mechanical system is shown which illustrates a system wherein the brakes 72 continuously "sense" the torque or "twisting force" in the drill pipe during a drilling operation. There are many devices (not shown) presently available for continuously indicating the magnitude of the "twisting force" or torque being applied to the drill string (not shown) during a well bore drilling operation. The purpose of these devices is to prevent the separation or "twist-off" failure of the drill pipe in the well bore which may result in a loss of the lower portion of the drill pipe down the well bore. When this occurs, the lost drill pipe must be recovered from the well bore by a suitable fishing operation, as is well known, which is expensive and time consuming, resulting in a delay of the drilling operation and adding to the overall cost thereof. Many devices may be arranged for providing a signal to a relay box 100, which is operably connected with a suitable driller's control valve 102, similar to the valve 78 hereinbefore set forth. The signal control device usually merely consists in the closing of an electrical contact, even momentarily, for impressing a signal on the relay box 100.

The relay box 100 may be of any suitable well-known type as widely used in the well bore drilling industry. For example, the relay box 100 as utilized in the present invention preferably contains a pair of identical electrical relays (not shown), a "reset" button (not shown), a terminal strip for the required electrical connections (not shown), and three electrical cable connectors (not shown). One connector is preferably indicated "signal", a second connector is preferably indicated "120 Vac", and the third connector is preferably indicated "load". The signal device (not shown) hereinbefore set forth passes a signal to the relay box 100 through a suitable line 104 whereupon one relay (not shown) of the box 100 closes a "latching" relay (not shown). The "latching" relay, in turn, supplies electrical power to the coil of a suitable solenoid air valve 106 through a load cable 108. Power remains on the valve 106 until the latching relay is de-energized by actuation of the normally closed "reset" button (not shown) of the relay box 100.

Activation of the "reset" button breaks the electrical circuit, removing the power from the valve 106.

The solenoid air valve 106 is preferably of a normally closed type; and when the valve 106 is energized, control air pressure is supplied through a suitable line 110 from an air supply source 112 to a suitable shuttle valve 114. The valve 114 diverts the air pressure through a line 116 to the pilot port of a normally open pilot valve 118, and simultaneously diverts the air pressure through a line 120 to a relay valve 122 similar to the valve 92. As hereinbefore set forth, the valve 92 is an optional feature and may be eliminated, if desired. The relay 122 directs the air pressure to the actuator 90 for application of the brakes 72.

The normally open pilot valve directs air pressure to the rotary clutch 46 through the quick release valve 84 and rotor seal 86. However, upon receiving the air pressure from the shuttle valve 114, the pilot valve 118 is closed, which stops or shuts off the air supply to the clutch 46 and exhausts the clutch control air to provide a rapid disengagement of the clutch 46. Simultaneously with the exhausting of the control air from the clutch 46, the brakes 72 are engaged in the manner as hereinbefore set forth.

It will be readily apparent that a signal applied to the relay box 100 indicating reverse torque in the drill pipe will immediately result in the application of the brakes 72 and disengaging the clutch 46, thus protecting the drawworks 10 from damage due to the reverse torque condition. During normal well bore drilling operations, the drilling personnel will exercise control of the clutch and brake with the air valve 78 or 102. However, when a reverse torque condition occurs in the drill string, the system of the present invention will automatically override the driller's control, and the clutch will be exhausted immediately with a simultaneously actuation of the brakes.

The disc brake assembly 50 of the present invention has great torque capacity and high heat energy dissipation capability to handle the most demanding braking requirements of modern day drilling operations. Of course, every drawworks arrangement is somewhat different than other such installations, but the braking system of the invention is applicable for installation in substantially any environment wherein rotary braking is needed.

With the system depicted in FIG. 4, the driller himself may be depended upon for sensing any torque conditions in the drill string and may quickly and easily activate the brakes 72 while disengaging the clutch 46. With the system depicted in FIG. 5, the reverse torque conditions in the drill string are automatically transmitted to the brake and clutch for simultaneous activation of the brakes and disengagement of the clutch.

Subsequent to the application of the brakes 72 in a reverse torque situation, the driller may operate the control valve 78 or 102 in the usual manner for reestablishing his own control of the well drilling operation and may ease off on the braking pressure or the like, as required, and as well known in the well bore drilling industry.

From the foregoing, it will be apparent that the present invention provides a novel rotary braking system for application of a disc-type braking apparatus in a reverse torque situation in drill string during a well bore drilling operation wherein the braking system is adapted for installation in association with the drawwords for immediately stopping the rotation of the main drive and clutch mechanism upon sensing of the reverse torque in the drill pipe. The novel system comprises a brake disc operably connected with a rotary member, such as the countershaft of the drawworks, said countershaft being operably connected with the clutch mechanism. As soon as reverse torque occurs in the drill pipe, the braking apparatus engages the brake disc for stopping rotation thereof in either a forward or reverse direction, thus precluding any transmission of the reverse torque to the clutch mechanism or other components of the drawworks.

Whereas the present invention has been described in particular relation to the drawings attached hereto, it should be understood that other and further modifications, apart from those shown or suggested herein may be made within the spirit and scope of this invention.

What is claimed is:

1. In combination with a drawworks operating a drill string during a well bore drilling operation, braking means comprising friction disc means connected wtih a rotary member of the drawworks for rotation simultaneously therewith, caliper brake means disposed in the proximity of the friction disc means for receiving the outer periphery of said disc means between the braking elements thereof, and means operably connected between the caliper brake means and the drill string for activation of said caliper brake means when reverse torque occurs in the drill string during the well bore drilling operation, and wherein said last-mentioned means comprises control valve means operable for supplying fluid pressure to the drawworks and caliper brake means for alternate actuation thereof, brake actuator means interposed between said control valve and said claiper brake means for selective activation by said control valve for actuation of said caliper brake means, and pilot valve means interposed between said control valve and said drawworks for isolating said drawworks from said drill string upon activation of said caliper brake means.

2. In combination with a drawworks operating a drill string during a well bore drilling operation, braking means as set forth in claim 1 and including means interposed between the drill string and the control valve for automatically sensing reverse torque in said drill string for automatic actuation of the control valve for application of said caliper brake means.

3. In combination with a drawworks operating a drill string during a well bore drilling operation, braking means as set forth in claim 1 wherein said brake actuator means is an air-over-oil valve means.

4. In combination with a drawworks operating a drill string during a well bore drilling operation, braking means as set forth in claim 1 and including relay valve means interposed between said control valve and said brake actuator means for increasing the speed of activation of the caliper brake means.

5. In combination with a drawworks operating a drill string during a well bore drilling operation, braking means for isolating the drawworks from the drill string when reverse torque occurs in the drill string and comprising friction disc means connected with a rotary member of the drawworks for rotation simultaneously therewith, caliper brake means disposed in the proximity of the outer periphery of the friction disc means for receiving said disc means between the braking elements thereof, and means operably connected between the caliper brake means and the drill string for activation of said caliper brake means when reverse torque occurs in the drill string during the well bore drilling operation, and wherein said rotary member is a countershaft operably connected with a clutch mechanism, and said friction disc means comprises an annular disc member connected with said counter shaft for rotation simultaneously therewith.

* * * * *